March 5, 1935.   L. A. BALLEW   1,993,130
ICE CREAM MAKING MACHINE
Filed June 27, 1933   4 Sheets-Sheet 2
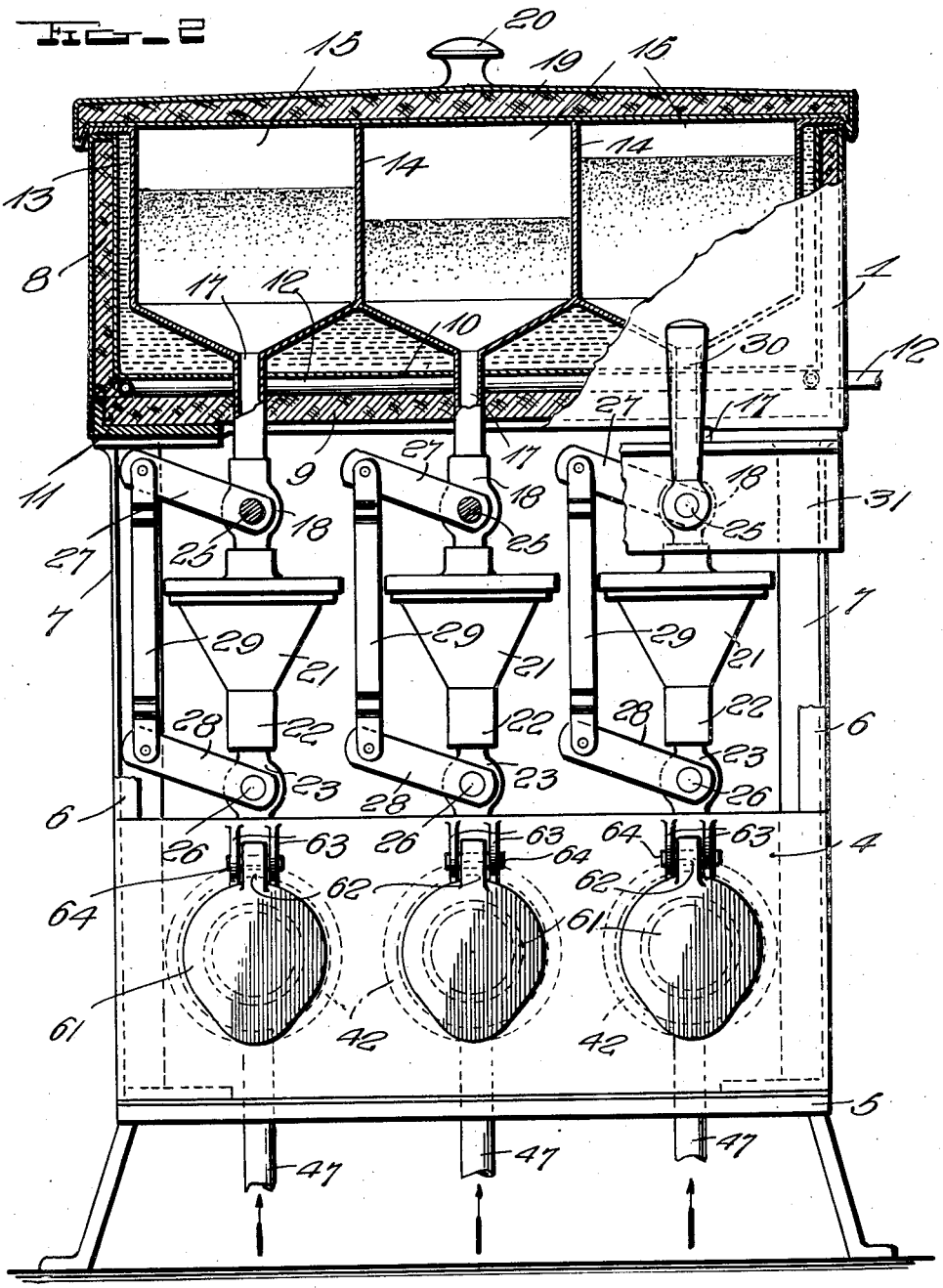
INVENTOR.
Lester A. Ballew,
BY Jacobi & Jacobi
ATTORNEYS.

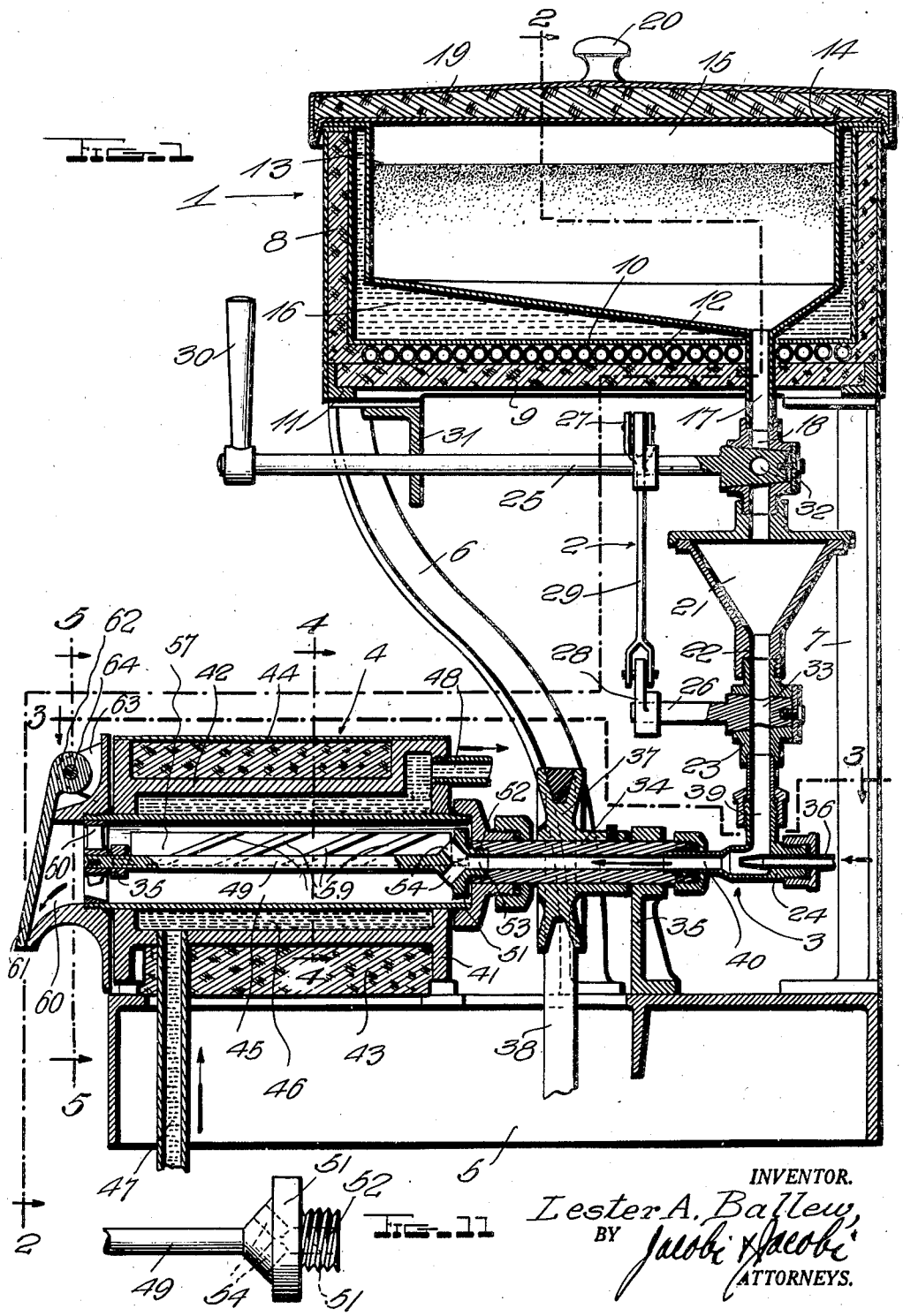

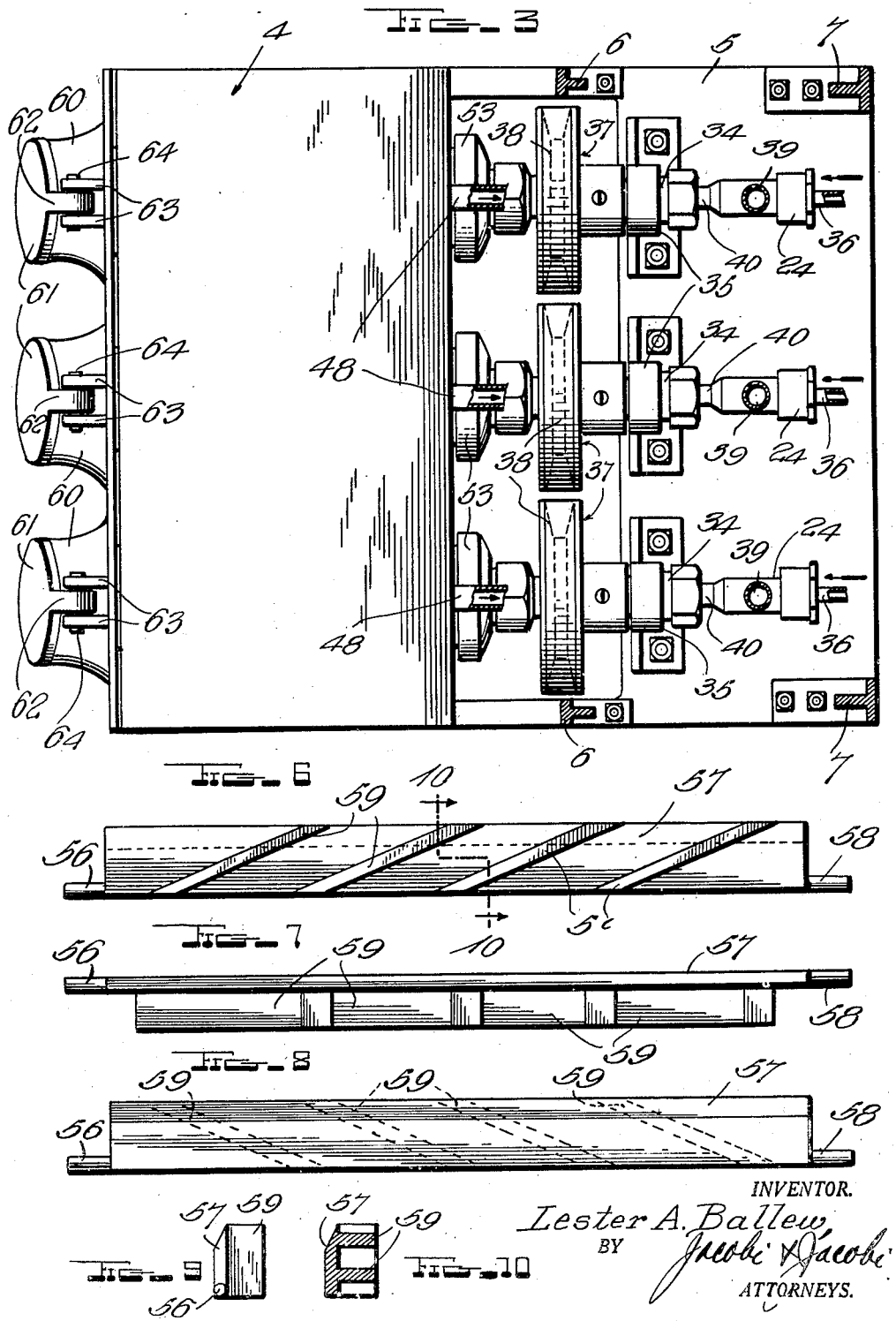

March 5, 1935.   L. A. BALLEW   1,993,130
ICE CREAM MAKING MACHINE
Filed June 27, 1933   4 Sheets-Sheet 4
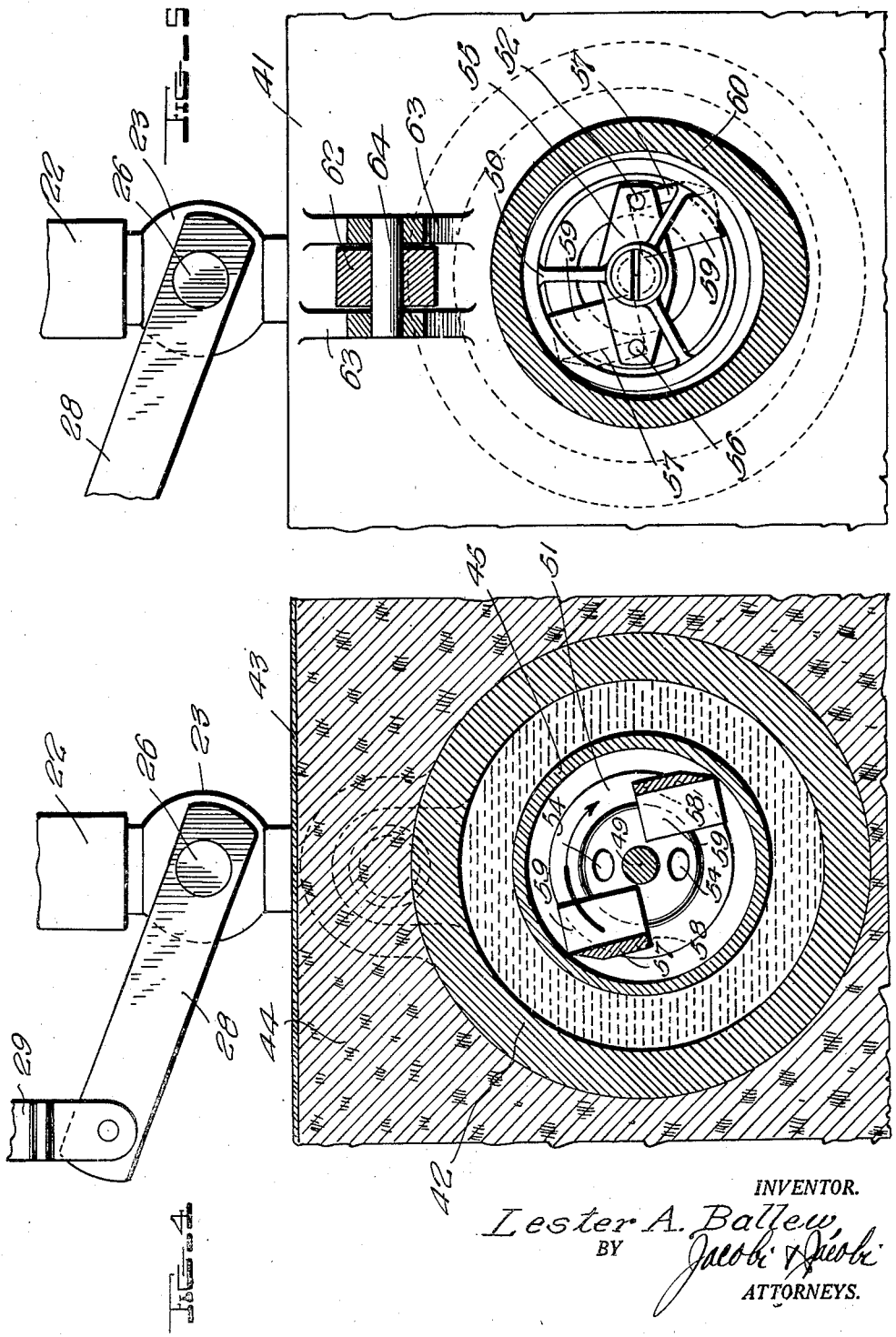
INVENTOR.
Lester A. Ballew,
BY
Jacobi & Jacobi
ATTORNEYS.

Patented Mar. 5, 1935

1,993,130

UNITED STATES PATENT OFFICE 1,993,130

ICE CREAM MAKING MACHINE

Lester A. Ballew, Johnson City, Tenn.

Application June 27, 1933, Serial No. 677,925

8 Claims. (Cl. 62—114)

This invention relates to refrigeration and more particularly to an improved ice cream freezer for use in confectionery stores, drug stores, ice cream stands and other places where ice cream, frozen custard, sherbets, ices, frozen desserts and/or any other frozen confection or commodity is sold in large or small quantities.

At the present time ice cream and various frozen confections are frozen in large quantities at a plant where it is stored until delivered to a consumer or to a distributing shop or stand, or it is made directly at the place of distribution where it is stored in a refrigerated container until served. When the ice cream is made at a plant expensive equipment is necessary to freeze the cream in bulk and store it in hardening rooms. Then it is necessary to transport it in a refrigerated vehicle to the dealer's place of business and the dealer must have refrigerated cabinets in which to store the ice cream until sold. In order to fill orders large quantities must be stored at the plant and therefore the ice cream is probably a week old when sold to a customer and has deteriorated in quality.

Therefore, one object of this invention is to provide improved apparatus by use of which ice cream in measured quantities may be individually made when ordered and delivered to the customer immediately after being frozen in a receptacle placed at the outlet of the machine. This eliminates refrigerated cabinets for storing ice cream delivered from a plant or dipping the ice cream from a container in which a quantity has accumulated from a counter machine and also assures the customer that the ice cream is fresh and not a cold storage product.

An important factor in the manufacture of ice cream is the ability to produce and control what is known as "overrun". The average overrun used by manufacturers is 100% and this means that with one gallon of mix they produce two gallons of ice cream by whipping air into the mix as it freezes. This makes the ice cream light and fluffy which improves its taste and also has an important bearing upon profits as the fluffy ice cream occupies more room than an equal weight of unwhipped cream and therefore less whipped cream by weight will be required to fill a receptacle of predetermined dimensions. It will be readily apparent that when a customer is served by dipping ice cream from a container and packing it into a box, the pressure exerted will cause a certain amount of air or "overrun" to be forced out, thus changing the texture of the cream and also materially affecting the question of whether the ice cream is sold at a profit or loss to the dealer.

Therefore, another object of the invention is to provide ice cream freezing apparatus of such construction that a measured quantity of mix may be delivered from a storage tank into a freezing chamber, have air mixed with it during delivery to the freezing chamber, be promptly frozen after entering the chamber to form ice cream or frozen custard, and immediately after being frozen delivered through an outlet into a box or other receptacle to be handed to the customer. This eliminates loss of "overrun" and also does away with having a surplus stock of ice cream on hand which must be kept frozen.

Another object of the invention is to permit the quantity of air mixed with the mix to be controlled and also cause this air to serve not only as means for aerating the mix but also as means for causing the mix to be fed into the freezing chamber in the form of a spray which will be immediately frozen upon striking cold walls of the chamber and can then be scraped off and delivered from the chamber through its outlet.

Still another object of the invention resides in providing a device which is simple and durable in construction, inexpensive to manufacture and one which will be very efficient in operation.

With these and numerous other objects in view, my invention consists in the novel features of construction, combination and arrangement of parts as will be hereinafter referred to and more particularly pointed out in the specification and claims.

The improved ice cream freezer is illustrated in the accompanying drawings wherein:

Figure 1 is a sectional view taken vertically through the freezer;

Figure 2 is a view taken along the line 2—2 of Figure 1 with portions of the freezer in section and other portions in front elevation;

Figure 3 is a view taken along the line 3—3 of Figure 1 with portions shown in transverse sections and other portions in top plan;

Figure 4 is a sectional view taken transversely through the freezing chamber along the line 4—4 of Figure 1;

Figure 5 is a fragmentary sectional view taken along the line 5—5 of Figure 1;

Figure 6 is an enlarged plan view of one of the scraper blades forming part of the improved freezer;

Figure 7 is an edge view of the scraper blade;

Figure 8 is a bottom plan view of the scraper blade;

Figure 9 is a view looking at one end of the scraper blade;

Figure 10 is a sectional view taken transversely through the scraper blade along the line 10—10 of Figure 6;

Figure 11 is a fragmentary view of the scraper shaft.

In describing the invention, I shall refer to the drawings in which similar reference characters designate corresponding parts throughout the several views: This improved ice cream freezer consists briefly of a storage tank indicated in general by the numeral 1, measuring apparatus 2, mixing means 3 which may be referred to as aerating means, and a freezer 4 into which the aerated mix is delivered in the form of a spray and frozen to form the ice cream. The mixing means serves not only to aerate the mix but also as means for delivering the same into the freezer in the form of a spray which is evenly distributed therein and immediately becomes frozen as it strikes the walls of the freezer.

The storage tank 1 is supported in an elevated position above a base 5 by front and rear legs 6 and 7 and referring to Figures 1 and 2, it will be seen that this tank has hollow walls filled with insulation as shown at 8 and is also provided with insulation 9 for its bottom 10. The sheet of insulation 9 rests upon a frame 11 of angle metal to which upper ends of the legs are secured and between the insulation and bottom 10 is provided a cooling coil 12. The liner 13 for the tank is partitioned as shown at 14 to form a plurality of chambers or compartments 15 to be filled with the mix of different flavors and while in the accompanying drawings, the tank has been shown divided into three chambers, it will be understood that any number may be provided, or in a small machine, the tank may be formed with a single compartment. The walls of the liner and its bottom are spaced from the walls and bottom of the tank or cabinet 1 to provide a space 16 filled with brine or other suitable refrigerating liquid to be cooled by the coil 12 and to chill the mix in the chambers 15, and the bottom of each chamber slopes from its sides and ends towards an outlet from which extends an outlet pipe 17. These pipes project downwardly from the cabinet 1 and are attached to valves 18 serving as inlet valves for the measuring apparatus. The cover 19 is also insulated and provided with a knob in order that it may be easily lifted when mix in one or more of the chambers must be replenished.

The measuring apparatus 2 consists of receptacles 21 corresponding in number to the chambers 15 and each of these receptacles tapers towards its lower end where it terminates in a neck 22 engaged with an outlet valve 23 having at its lower end a nipple connected by a union to an injector 24 forming part of the mixing apparatus. The stems 25 and 26 of the plugs for the valves 18 and 23 project forwardly from the valves and carry levers or arms 27 and 28 connected by links 29 so that the two valves will be simultaneously moved when the upper stem is turned by grasping its handle 30. The stems of the upper valves are longer than the stems of the lower valves and are rotatably engaged through a bearing plate 31 mounted beneath the cabinet or tank 1. Therefore, the handles of the upper valves may be easily reached when the valves are to be adjusted. It should be noted that the arms of the valves are so arranged that the ports 32 and 33 of the two valves extend perpendicular to each other. By this arrangement, one valve will be closed when the other is open and by properly manipulating the handle, the upper valve may be opened to admit mix into the measuring receptacle while the lower valve is closed and after the receptacle has been filled with a measured quantity of mix, the upper valve closed and the lower valve opened to permit the mix to flow out of the measuring receptacle into the injector of the mixing apparatus.

Each mixing apparatus has its injector extending horizontally back of a tube or hollow shaft 34 rotatably engaged through a bearing bracket 35 rising from the base 5 to which it is secured by bolts or other suitable fasteners. The air pipe 36 of the injector leads from a source of air under pressure and valves will be provided at convenient points in the pipes 36 to permit flow of air through the injectors to be controlled. A pulley 37 is fixed to each shaft 34 in front of the bearing bracket through which the shaft extends and belts 38 transmit rotation to the shafts from a suitable source of power. Since the nozzle or inner end of the air pipe extends across the lower end of the vertically extending neck 39 of the injector, the jet of air under pressure delivered from the nozzle will cause the mix to be thoroughly aerated and propelled forwardly through the horizontal neck 40 of the injector and hollow shaft at a high rate of speed for delivery into the freezer.

The freezer 4 rests upon the forward portion of the base 5 and extends the full width thereof as shown in Figures 2 and 3. The casing 41 of the freezer is formed of strong metal and has front and rear walls between which extend cylinders 42 corresponding in number to the chambers 15 and measuring receptacles 21. The cylinders are surrounded by insulation 43 to exclude outside heat and an upper plate 44 is provided to protect the insulation as shown in Figure 1. Tubular chambers 45 extend through the cylinders 42 in spaced relation to the walls thereof to provide space about the chambers filled with refrigerating liquid as shown at 46 and circulation of the liquid is established through the medium of pipes 47 and 48 from a conventional source of supply and it is to be understood that this liquid after leaving the freezer passes to the coil 12 before returning to the source of supply. By this arrangement, the freezing chambers will be reduced to such a temperature that the aerated mix when injected into the freezer will be immediately frozen as it strikes the walls of the freezing chambers and the refrigerating liquid upon reaching the coil 12 will still be sufficiently cold to chill the mix in the chambers 15.

In order to spray the aerated mix against the walls of the freezing chambers and then scrape the ice cream from the walls there has been provided in each chamber a combined scraper and sprayer having a shaft 49 which extends axially through the freezing chamber and at its front end is rotatably mounted through the medium of a spider 50. At its rear end, the shaft 49 is formed with a head or collar 51 and threaded shank 52 screwed into the front end of the companion hollow shaft 34 which is rotatably mounted in a removable head or cap threaded upon the rear end of the freezing chamber 45. The bore 53 of the shank 52 forms a continuation of the bore of the hollow shaft 34 and has branches 54 opening through the front of the collar at opposite sides of the shaft.

By this arrangement, the shaft 49 turns with the shaft 34, and mix which is fed through their registering bores will be discharged through the branches into the freezing chamber as a whirling spray and be evenly distributed in the freezing chamber for contact with its walls which immediately convert it into ice cream. A yoke or cross bar 55 (Fig. 5) is fixed to the shaft 49 adjacent the spider 50 with its end portions projecting equal distances from opposite sides of the shaft and formed with openings to receive pintles 56 at the front ends of scraping blades 57 which extend longitudinally in the freezing chamber and at their rear ends have other pintles 58 received in openings formed in the collar 51. By having the blades so mounted, they will be thrown outwardly against the walls of the freezing chamber as the shaft 49 rotates and scrape the frozen mix from the walls immediately after it has formed thereon. Side fins 59 projecting from the blades at an angle longitudinally thereof serve as pushers to move the ice cream forwardly during rotation of the scraper shaft and upon reaching the front end of the freezing chamber, the ice cream will be forced outwardly through a discharge spout 60 and caught in a box, cone or other receptacle held beneath the spout. A cover or gate 61 is provided for each spout to exclude warm air from the freezing chambers and since each gate is pivotally mounted by a hinge ear 62 extending from its upper portion and pivoted between ears 63 by a pin 64, these gates will normally remain closed and of their own weight return to a closed position when released after being opened.

The operation of this improved ice cream freezer is as follows: The machine is set up in a store with the base 5 resting upon a counter or suitable frame where it is firmly secured and a motor and drive shaft carrying pulleys about which the belts 38 are trained installed in the frame or under the counter beneath the base. An air tank from which the pipes 36 lead may also be mounted in the frame and a cooling unit for the refrigerating liquid installed and connected with pipes leading to the refrigerating jackets of the freezing chambers and refrigerating coils for the receptacles 15. Mix is poured into the receptacles 15 where it is chilled and thus prevented from turning sour and also given a preliminary chill so that it will freeze quickly when injected into a freezing chamber. It will be understood that mix of different flavors will be poured into the receptacles in order that the dealer may sell ice cream of more than one flavor. When ice cream is ordered the handle 30 beneath the receptacle containing mix of the desired flavor is turned to open the valve 18 and close the valve 23, thereby allowing mix to run into the measuring receptacle 21 and fill the same. The handle is then moved in the opposite direction to close the upper valve and open the lower one so that the measured quantity of mix can flow to the mixing apparatus. The quantity of mix delivered to the mixing apparatus is approximately half the quantity of ice cream ordered. As the mix passes through the injector, air from the pipe 36 causes the mix to be thoroughly aerated and in addition forces the aerated mix forwardly so that it passes through the rotating shaft 34 into the bore 51 of the scraper shaft from which it is discharged through the branches 54 as a spray into the freezing chamber. The sprayed mix whirls through the freezing chamber and upon striking the walls which are very cold is immediately frozen to form ice cream. As the ice cream is formed against walls of the freezing chamber, it is scraped off by the blades 57 and urged forwardly by the side fins 59 until it reaches the front end of the chamber and passes out through the spout 60 into a box or other receptacle held beneath the spout. The gate 61 will be lifted in order to permit the ice cream to pass out and when released, it falls back to a closed position.

It will thus be seen that the ice cream, ices, sherbets, frozen custard or other frozen confections or commodities will be individually frozen for each customer and also will not be subjected to pressure by being scooped out of a can or other container. Therefore, overrun is not lost and also the ice cream retains its fluffy texture and is very smooth and pleasant in taste. The fact that the mix is not frozen until ordered insures fresh ice cream and pleases the customer and also eliminates use of refrigerated storage cabinets for cans of bulk ice cream and expensive cold storage rooms at manufacturing plants.

While I have particularly referred heretofore in this application to a method and apparatus for freezing ice cream, it will be understood that the same is equally well applicable to the manufacture of ices, sherbets, frozen custard, frozen fruit and/or any other frozen confections or commodities in which the incorporation of air and instant freezing are necessary to improve the quality and flavor thereof and insure profitable handling.

From the foregoing description of the construction of my improved apparatus, the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention what is claimed is:

1. Liquid refrigerating apparatus comprising a reservoir for mix, a horizontal freezing chamber disposed in a plane below the reservoir and having an outlet at its front end, means below said reservoir for delivering measured quantities of mix from the reservoir, an injector receiving mix from said measuring means, a rotary tube extending from said injector into the rear end of said freezing chamber, a rotary shaft extending axially through said freezing chamber with its rear end detachably coupled to the inner end of said tube and formed with an annular collar abutting the tube, said shaft having its rear end portion formed with a bore registering with the bore of the tube and formed with side branches extending diagonally through the collar whereby aerated mix will be discharged from the tube into the freezing chamber as a whirling spray for conversion into ice cream upon contact with walls of the chamber, a yoke carried by said shaft adjacent the front end of said chamber with its end portions projecting from opposite sides of the shaft, and scraping blades extending longitudinally of said shaft with their ends pivotally engaged with the collar and ends of said yoke, said blades being urged into engagement with walls of the chamber by centrifugal force when the shaft is rotating and serving to scrape ice cream from the walls and deliver the same through the outlet at the front end of the chamber.

2. In a freezer for freezing liquids by spraying, a liquid reservoir, a freezer chamber, a sprayer head in said freezer chamber having diverging openings adapted for spraying liquid on the surface of said freezer chamber, an injector unit comprising a mixing chamber and an air nozzle projecting into said mixing chamber, a liquid entrance pipe connecting with said liquid reservoir and entering said mixing chamber immediately back of the tip of said air nozzle and substantially perpendicular thereto, said mixing chamber having an exit port substantially opposite the tip of said air nozzle and communicating with said sprayer head, and a source of compressed air connected to said air nozzle.

3. In a freezer for freezing liquids by spraying, a liquid reservoir, a freezer chamber, a sprayer head in said freezer chamber having diverging openings adapted for spraying liquid on the surface of said freezer chamber, an injector unit comprising a mixing chamber and a conically tapered air nozzle projecting into said mixing chamber, a liquid entrance pipe connecting with said liquid reservoir and entering said mixing chamber immediately back of the tip of said air nozzle and over the conically tapered portion of said nozzle and substantially perpendicular thereto, said mixing chamber having an exit port substantially opposite the tip of said air nozzle and communicating with said sprayer head, and a source of compressed air connected to said air nozzle.

4. In a freezer for freezing liquids by spraying, a liquid reservoir, a freezer chamber, a rotatable sprayer head in said freezer chamber having diverging openings adapted for spraying liquid on the surface of said freezer chamber, an injector unit comprising a mixing chamber and a conically tapered air nozzle projecting into said mixing chamber, said mixing chamber having a cylindrical base portion surrounding said nozzle and having a conical terminal portion immediately in front of the conically tapered portion of said nozzle, said conical terminal portion of said mixing chamber having an exit port substantially opposite said nozzle and communicating with said sprayer head, a liquid entrance pipe connecting with said liquid reservoir and entering said mixing chamber immediately back of the tip of said air nozzle and over the conically tapered portion of said nozzle and substantially perpendicular thereto, and a source of compressed air connected to said air nozzle.

5. In a freezer for freezing liquids by spraying, a liquid reservoir, a freezer chamber, a sprayer head in said freezer chamber having diverging openings adapted for spraying liquid on the surface of said freezer chamber, an injector unit comprising a mixing chamber and an air nozzle projecting into said mixing chamber, measuring dispensing means for controllably delivering a predetermined quantity of said liquid at controllable intervals having an inlet connected to said liquid reservoir, an entrance conduit connected to the outlet of said means and entering said mixing chamber immediately back of the tip of said air nozzle and substantially perpendicular thereto, said mixing chamber having an exit port substantially opposite the tip of said air nozzle and communicating with said sprayer head, and a source of compressed air connected to said air nozzle.

6. In a freezer for freezing liquids by spraying, a liquid reservoir, a freezer chamber, a sprayer head in said freezer chamber having diverging openings adapted for spraying liquid on the surface of said freezer chamber, an injector unit comprising a mixing chamber and a conically tapered air nozzle projecting into said mixing chamber, measuring dispensing means for controllably delivering a predetermined quantity of said liquid at controllable intervals having an inlet connected to said liquid reservoir, an entrance conduit connected to the outlet of said means and entering said mixing chamber immediately back of the tip of said air nozzle and over the conically tapered portion of said nozzle and substantially perpendicular thereto, said mixing chamber having an exit port substantially opposite the tip of said air nozzle and communicating with said sprayer head, and a source of compressed air connected to said air nozzle.

7. In a freezer for freezing liquids by spraying, a liquid reservoir, a cylindrical freezer chamber, a sprayer head in said freezer chamber having diverging openings adapted for spraying liquid on the surface of said freezer chamber, an injector unit comprising a mixing chamber and an air nozzle projecting into said mixing chamber, a liquid entrance pipe connecting said liquid reservoir with said mixing chamber, said mixing chamber having an exit port substantially opposite the tip of said air nozzle and communicating with said sprayer head, a source of compressed air connected to said air nozzle, an axial shaft in said cylindrical freezer chamber, a pair of mounting disc plates carried by said shaft perpendicular thereto and being provided with circular apertures near the circumference thereof, each aperture in one of said plates being in register with a corresponding aperture in the other of said plates, a plurality of scraper blades, and pivotal means carried at each end of said scraper blades for pivotally mounting each of said blades in corresponding apertures in said plates, whereby said blades are centrifugally thrown outward and engage the surface of said freezing chamber in scraping contact when said shaft is rotated.

8. In a freezer for freezing liquids by spraying, a liquid reservoir, a cylindrical freezer chamber, a sprayer head in said freezer chamber having diverging openings adapted for spraying liquid on the surface of said freezer chamber, an injector unit comprising a mixing chamber and an air nozzle projecting into said mixing chamber, a liquid entrance pipe connecting said liquid reservoir with said mixing chamber, said mixing chamber having an exit port substantially opposite the tip of said air nozzle and communicating with said sprayer head, a source of compressed air connected to said air nozzle, an axial shaft in said cylindrical freezer chamber, a pair of mounting disc plates carried by said shaft perpendicular thereto and being provided with circular apertures near the circumference thereof, each aperture in one of said plates being in register with a corresponding aperture in the other of said plates, a plurality of scraper blades, pivotal means carried at each end of said scraper blades for pivotally mounting each of said blades in corresponding apertures in said plates, and a plurality of side fins mounted obliquely on each of said blades and projecting therefrom for propelling the frozen mixture through said freezer chamber.

LESTER A. BALLEW.